May 17, 1938.   M. J. STONE   2,117,688
PROPELLER CONSTRUCTION
Filed Feb. 5, 1937   2 Sheets-Sheet 1
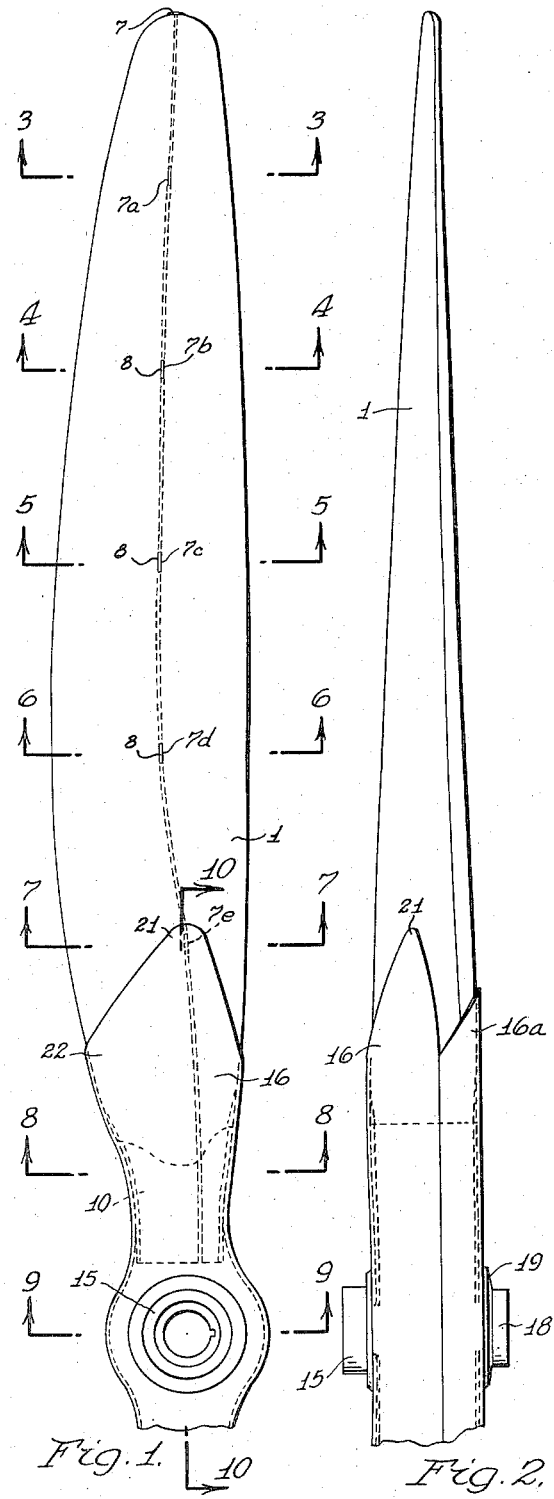
INVENTOR.
Morris J. Stone
BY
ATTORNEY.

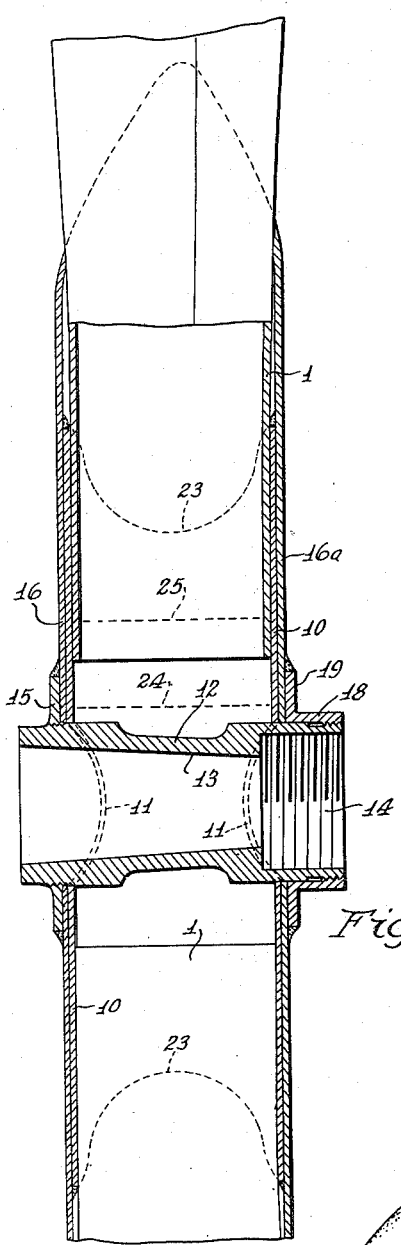
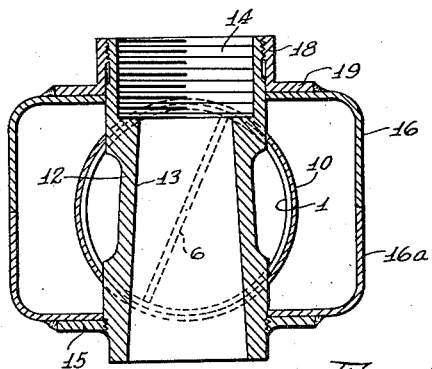
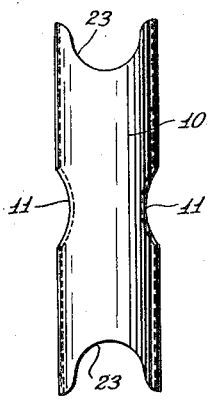
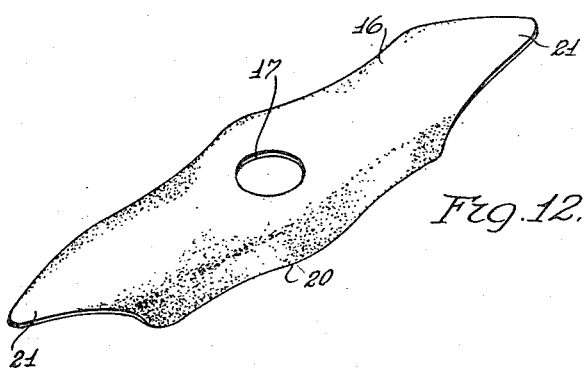

Patented May 17, 1938

2,117,688

UNITED STATES PATENT OFFICE 2,117,688

PROPELLER CONSTRUCTION

Morris J. Stone, Detroit, Mich., assignor to Barkley-Grow Aircraft Corporation, Detroit, Mich., a corporation of Michigan Application February 5, 1937, Serial No. 124,184

10 Claims. (Cl. 170—159)

This invention relates to propellers for airplanes and has for its object to provide a hub and blade construction of light weight which can be made economically and which lends itself to the manufacture of a wide range of design without requiring change in blade formation.

Another object is to provide a propeller construction comprising a hub, a connector and blades telescoping therewith, the propeller being of any desired pitch according to the selected angle during assembly and the diameter thereof being variable through a substantial range according to the length of connector employed, the connector being tubular.

Another object is to provide a retainer sleeve for enveloping said connector and the inner ends of said blade, the sleeve being securely fixed, as by welding, to the central part of said hub portion and similarly secured to each blade, each blade being also directly secured to the connector at the region of telescoping therewith whereby a very safe and very sturdy assembly results.

Another object is to provide a hollow blade construction having an internal rib so positioned and secured to the opposite faces thereof as to obtain improved stiffness over former hollow constructions.

Other objects and advantages will become hereinafter more fully apparent as reference is had to the accompanying drawings.

Fig. 1 is a plan view of my improved propeller taken parallel to the axis of the hub with one blade partially broken away.

Fig. 2 is an elevation taken at right angles to Fig. 1,

Figs. 3, 4, 5, 6, 7, 8 and 9 are transverse sections taken along the lines 3—3, 4—4, 5—5, 6—6, 7—7, 8—8 and 9—9 respectively, of Fig. 1, Fig. 10 is a longitudinal section taken along the line 10—10 of Fig. 1, Fig. 11 is an elevation of the connector and Fig. 12 is a perspective view of one-half of the sleeve.

More particularly 1 indicates the blades, of which there are preferably two, each of which is hollow and of identical construction. The blade is composed of two parts or faces 2 and 3 which are bevelled at each edge 4 and 5 to permit of a proper weld, the abutting edges being turned so that the weld is substantially parallel to the part 2. The two parts 2 and 3 are braced by a central rib 6 which extends the entire length of the blades and is welded to both parts 2 and 3 at the tip 7. Each part 2 and 3 is provided with slots through which projections 8 of the rib 6 extend. The projections are then welded at 7a, 7b, 7c etc. to each part 2 and 3 and the weld is ground off smoothly in order not to interfere with or change the outer contour of the blade. It is important to note that the rib 6 does not form a right angle with either part 2 or 3 but slopes toward the trailing edge 9 so that the angles a are greater than 90°. The dotted lines b—b indicate the position which this rib would have if it were normal to the parts. This construction embodying angularity of the rib adds considerable resistance to deformation during operation.

The blades 1 telescope into a tubular member or connector 10 which has central transverse openings 11 therethrough through which a hub 12 extends. The hub has a tapered interior 13 for reception of an engine shaft, the taper terminating at an enlarged threaded portion 14 for a nut. A flange 15 radiates from the inner end of the hub. This flange 15 does not directly abut the connector 10 since a half sleeve 16 having an opening 17 therethrough is placed against the connector before insertion of the hub and the flange 15 abuts this half sleeve and is fixedly secured thereto as by welding at its peripheral edge 17. The exterior of the internally threaded portion 14 is also threaded to receive a nut 18 which is flared at its inner end 19. Before the nut 18 is screwed into place another half sleeve 16a identical with the half sleeve 16 is placed adjacent the connector with the portion 14 extending through its opening. The nut 18 is then screwed into place, drawing the flare 19 tightly against the half sleeve 16a. This also draws the two half sleeves tightly against the connector. The periphery of the flare 19 is then welded to the sleeve 16a.

The half sleeves 16 and 16a are welded along their abutting edges 20 to each other. Each outer end 21,—that is, that portion of the sleeves which extend beyond the contact with each other, extend along the blades 1 beyond the ends of the connector 10 and are of generally triangular shape. They are welded along the edge of the portions 21 directly to the blade.

It will be best seen in Fig. 1 that the inner cylindrical portion of the blade changes contour quite rapidly forming a shoulder region at 22 and that the sleeve 16, 16a covers this shoulder whereas the connector 10 terminates short of the shoulder. The connector 10 is cut back at each end 23 so that it will not have to be deformed to contact the blades.

With this manner of construction, a number of different blades for various horsepower engines and for various types of services may be made without altering the blades. Thus, the blades may be inserted into the connector to a point very close to the hub as indicated by the dotted line 24, Fig. 10, or there may be a substantial distance between the hub and the blade as indicated by the dotted line 25. The maximum outward distance 25 may be substantially increased by employing a longer connector. The necessary strength for such changes can be added simply by increasing the length of the sleeves. It is recommended that the sleeve extend to the shoulder portion 22 in any case. The degree of stiffness imparted to the blades by the sleeve can be substantially varied by increasing or decreasing the triangular ends of the sleeves. The length of connector and length and shape of sleeve are therefore chosen according to the kind of service to which the propeller is to be put. This is very materially more economical than changing the blade formation.

The pitch of the blades in the connector may be made any desired value simply by rotation thereof during assembly.

What I claim is:—

1. A propeller comprising a tubular hub portion having a central transverse propeller shaft receiving portion, propeller blades telescoping into each end of said tubular portion, a split sleeve enveloping said tubular portion and integrally secured thereto, said sleeve extending outwardly beyond said tubular portion and being integrally secured to each of said blades at its outer edges, said tubular portion also being directly secured to said blades.

2. In a propeller, a tubular connector open at each end and having transverse alined openings therethrough, a flanged hub extending through said openings, blades each having a cylindrical portion telescoping into the open ends of said connector and integrally secured thereto, a half sleeve having an opening therethrough alined with the openings of said connector and residing against said connector, the flange of said hub residing outwardly of said half sleeve and integrally secured thereto, another half sleeve also having an opening therethru and residing against the remaining portion of said connector with its opening in alinement with the openings of said connector and with said hub extending therethrough, and a nut threaded onto said hub and integrally secured to said sleeve.

3. In a propeller, a tubular connector open at each end and having transverse alined openings therethrough, a flanged hub extending through said openings, blades each having a cylindrical portion telescoping into the open ends of said connector and integrally secured thereto, a half sleeve having an opening therethrough alined with the openings of said connector and residing against said connector, the flange of said hub residing outwardly of said half sleeve and integrally secured thereto, another half sleeve also having an opening therethru and residing against the remaining portion of said connector with its opening in alinement with the openings of said connector and with said hub extending therethrough, said half sleeves being integrally secured together along abutting edges and extending outwardly beyond the outer ends of said connector for attachment to said blades.

4. In a propeller, a tubular hub portion comprising a tubular portion and an engine shaft receiving portion, blades telescoping with each end of said connector, and means connecting said shaft receiving portion and said blades, said means constituting a sleeve which extends over a substantial portion of said blades as a stiffener therefor.

5. A hollow propeller blade having a single strengthening rib extending longitudinally thereof and integrally secured to opposite faces thereof, said rib having an angle of lean toward the trailing edge thereof.

6. A hollow propeller blade having a strengthening rib extending longitudinally thereof and integrally secured to opposite faces thereof at intervals, one of the points of securement being at the tip of the blade.

7. A hollow propeller blade having a strengthening rib extending longitudinally thereof and integrally secured to opposite faces thereof at intervals, one of the points of securement being at the tip of the blade, said rib being angularly disposed with respect to said faces and leaning toward the trailing edge of the blade.

8. In a propeller, a connector into each end of which a blade telescopes and a hub extending transversely through said connector, said connector and said blades being adapted to telescope to the extent of a substantial range whereby to vary the overall length according to a predetermined use, and a sleeve enveloping said connector and attached at its outer ends directly to said blades, said sleeve being selected as to length according to the amount of telescoping and the degree of stiffness required.

9. In a propeller, a connector into each end of which a blade telescopes, and a hub extending transversely through said connector, said connector and said blades being adapted to telescope to the extent of a substantial range whereby to vary the overall length according to a predetermined use, said blades each having a cylindrical end portion which flares outwardly rather abruptly forming a shoulder portion at the leading edge of the blade, and a sleeve enveloping said connector and extending outwardly thereof at each end for direct connection to said blades, said sleeve having a length sufficient to cover said shoulders.

10. In a propeller, a connector into each end of which a blade telescopes, and a hub extending transversely through said connector, said connector and said blades being adapted to telescope to the extent of a substantial range whereby to vary the overall length according to a predetermined use, said blades each having a cylindrical end portion which flares outwardly rather abruptly forming a shoulder portion at the leading edge of the blade, and a sleeve enveloping said connector and extending outwardly thereof at each end for direct connection to said blades, said sleeve having a length sufficient to cover said shoulders, said sleeve terminating in end portions of generally triangular shape with the apices of the end portions being substantially midway between the leading and trailing edges of the blades.

MORRIS J. STONE.